(12) United States Patent
Bose et al.

(10) Patent No.: US 11,319,742 B2
(45) Date of Patent: May 3, 2022

(54) DOOR MODULE WITH FRAMELESS GLASS CONFIGURATION HAVING ADJUSTABLE GLASS RUN CHANNELS

(71) Applicant: MAGNA CLOSURES INC., Newmarket (CA)

(72) Inventors: Saikat Bose, Richmond Hill (CA); Raymond Edward Fortin, Newmarket (CA); Michael Bayley, Unionville (CA)

(73) Assignee: MAGNA CLOSURES INC., Newmarket (CA)

( * ) Notice: Subject to any disclaimer, the term of this patent is extended or adjusted under 35 U.S.C. 154(b) by 178 days.

(21) Appl. No.: 16/656,849

(22) Filed: Oct. 18, 2019

(65) Prior Publication Data
US 2020/0123832 A1  Apr. 23, 2020

Related U.S. Application Data

(60) Provisional application No. 62/747,230, filed on Oct. 18, 2018.

(51) Int. Cl.
| | | |
|---|---|---|
| *E05D 15/10* | (2006.01) | |
| *E05F 11/48* | (2006.01) | |
| *E05D 15/16* | (2006.01) | |
| *B60J 5/04* | (2006.01) | |
| *B62D 65/06* | (2006.01) | |
| *B60J 1/17* | (2006.01) | |

(52) U.S. Cl.
CPC .............. *E05F 11/483* (2013.01); *B60J 1/17* (2013.01); *B60J 5/0413* (2013.01); *B62D 65/06* (2013.01); *E05D 15/165* (2013.01); *E05Y 2900/55* (2013.01)

(58) Field of Classification Search
CPC . B60J 5/0413; B60J 1/17; B60J 5/0416; B60J 5/0401; B60J 5/0402; E05Y 2900/55; E05Y 2800/20; E05Y 2201/684; E05Y 2600/10; E05F 11/40; E05F 15/689
USPC ........................................................... 49/212
See application file for complete search history.

(56) References Cited

U.S. PATENT DOCUMENTS

| | | | | | |
|---|---|---|---|---|---|
| 3,844,064 | A | * | 10/1974 | Yamaha ..................... | B60J 1/17 49/348 |
| 4,761,915 | A | * | 8/1988 | Marz .......................... | B60J 1/17 49/374 |
| 4,956,942 | A | * | 9/1990 | Lisak ......................... | B60J 1/17 49/212 |
| 5,430,976 | A | * | 7/1995 | Wirsing ................ | E05F 11/382 49/452 |
| 5,855,095 | A | * | 1/1999 | Dedrich ................ | B60J 5/0468 49/502 |
| 5,927,021 | A | * | 7/1999 | Kowalski ............... | B60J 5/0416 49/502 |
| 5,960,588 | A | * | 10/1999 | Wurm .................... | B60J 5/0416 49/212 |

(Continued)

*Primary Examiner* — Jerry E Redman
(74) *Attorney, Agent, or Firm* — Dickinson Wright PLLC

(57) ABSTRACT

A carrier module including a pair of carrier members operably coupled to one another via at least one cable is provided. The carrier members are configured for substantially free movement relative to one another to facilitate installation of the carrier members into an internal door cavity through an opening formed in the inner panel, wherein at least one of the carrier members is adjustable along at least one of cross-vehicle, aft/forward, and up/down directions.

16 Claims, 13 Drawing Sheets

(56) References Cited

U.S. PATENT DOCUMENTS

| | | | | |
|---|---|---|---|---|
| 6,425,208 B1* | 7/2002 | Klueger | ............... | E05F 11/382 49/348 |
| 6,561,567 B2* | 5/2003 | Mrozowski | ........... | E05F 11/525 296/146.11 |
| 6,952,898 B2* | 10/2005 | Castellon | .................. | B60J 1/17 49/349 |
| 7,246,464 B2* | 7/2007 | Castellon | ............. | E05F 11/382 49/212 |
| 7,743,559 B2* | 6/2010 | Papi | ...................... | B60J 5/0416 49/502 |
| 7,877,932 B2* | 2/2011 | Kriese | .................. | E05F 11/483 49/352 |
| 8,069,610 B2* | 12/2011 | Graf | ..................... | E05F 11/382 49/348 |
| 8,127,493 B2* | 3/2012 | Cappelli | .............. | E05F 11/382 49/212 |
| 8,516,746 B2* | 8/2013 | Polimeni | .............. | E05F 11/385 49/352 |
| 8,528,259 B1* | 9/2013 | Heirtzler | .............. | E05F 11/382 49/506 |
| 8,646,209 B2* | 2/2014 | Hampel | ............... | E05F 11/382 49/212 |
| 2002/0066232 A1* | 6/2002 | Tatsumi | ................ | B60J 5/0416 49/502 |
| 2006/0254146 A1* | 11/2006 | Florentin | ............. | E05F 11/382 49/349 |
| 2008/0148647 A1* | 6/2008 | Pavlovic | .............. | E05F 11/382 49/502 |
| 2009/0211159 A1* | 8/2009 | Lennarella | ........... | E05F 11/382 49/358 |

* cited by examiner

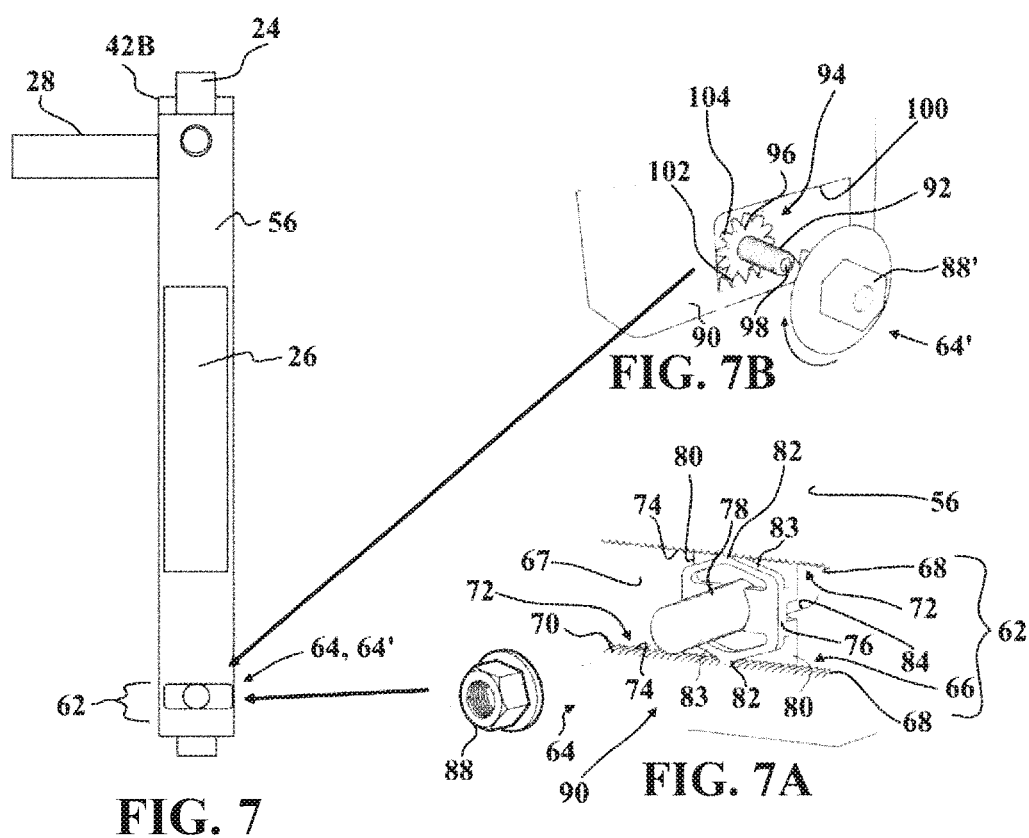

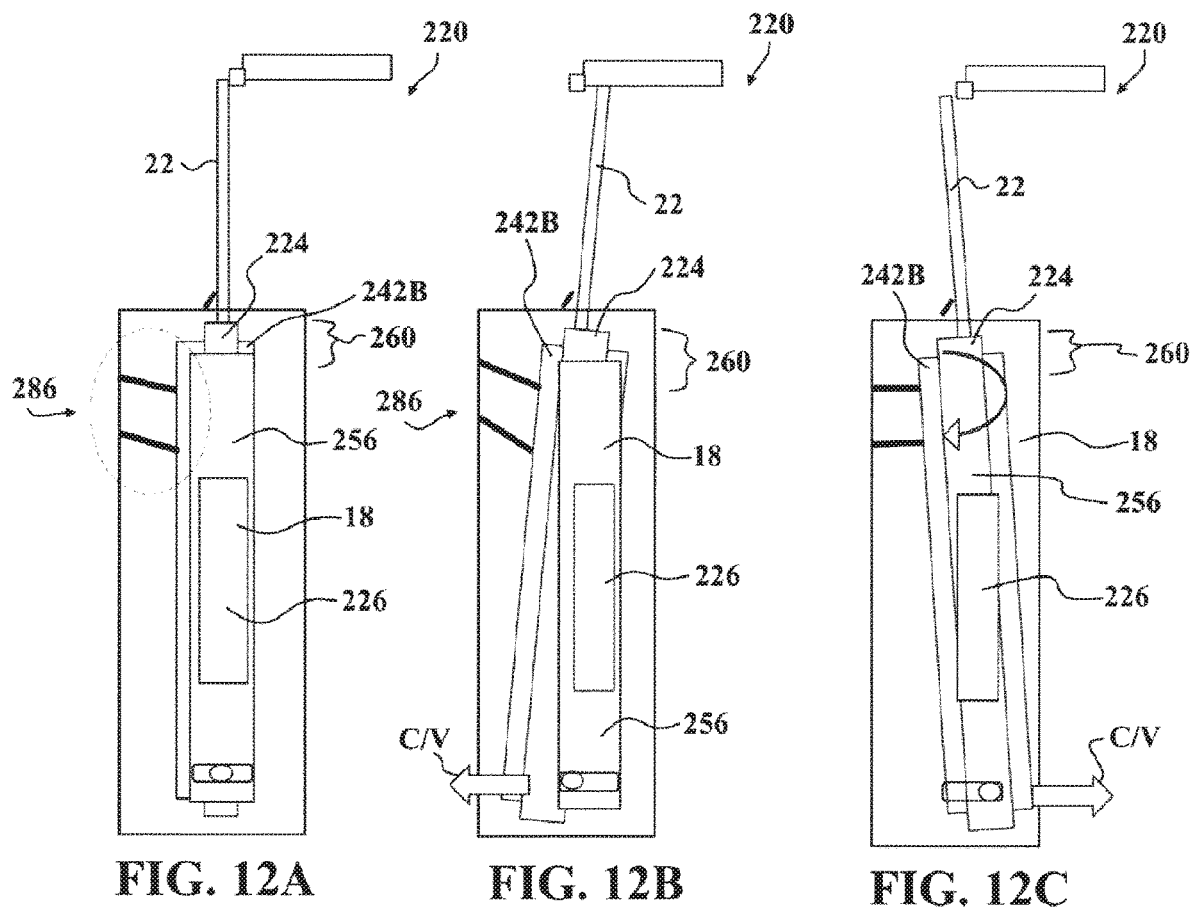

DOOR MODULE WITH FRAMELESS GLASS CONFIGURATION HAVING ADJUSTABLE GLASS RUN CHANNELS

CROSS-REFERENCE TO RELATED APPLICATION

This application claims the benefit of U.S. Provisional Application Ser. No. 62/747,230, filed Oct. 18, 2018, which is incorporated herein by way of reference in its entirety.

FIELD

The present disclosure relates generally to vehicle door assemblies, and more particularly to a door module of a door assembly having adjustable glass run channels.

BACKGROUND

This section provides background information related to the present disclosure which is not necessarily prior art.

In many motor vehicle door assemblies, an outer sheet metal door panel and an inner sheet metal door panel are connected together to define an internal door cavity therebetween. An equipment module or sub-assembly, commonly referred to as a carrier module, or simply carrier, is often mounted to the inner door panel within the internal door cavity. The carrier typically functions to support various door hardware components, including latch presenter, door handle, window regulator rails configured to support lifter plates for slidable movement there along, and other features. The window regulator rails and lifter plates are typically bulky, heavy, complex metal components due to the need for the window to be made adjustable and to resist deflection. Proper adjustment of the window, such as during assembly, is crucial to ensure the window follows the desired path while being opened and closed to avoid window jams and to perfect a seal when closed. However, in vehicles that require so called "frameless" doors, such as are commonly used on convertibles, glass run channels, along which a window traverses upwardly and downwardly in guided fashion, are commonly supplied as separate components from the door module due to their need to be adjusted and positioned independently from the fixed components on the door module. As such, the glass run channels are typically supplied and assembled separately from the carrier and components thereon, thus, requiring additional components in inventory and inventory space, and further requiring additional handling and processes in assembly, thereby ultimately increasing cost. Otherwise, if the glass run channels are fixed to the carrier, typically the fixed components, such as latch, door handle, and any other components that need to be maintained in a single, precisely fixed location are assembled separately from the door module, thereby allowing the door module to be adjusted with the glass run channels fixed thereon, while allowing the remaining components separated from the door module to remain in their fixed locations. However, this results in the same cost increasing issues related to additional inventory and additional assembly processes as discussed above.

In view of the above, there is a need to provide a carrier module for a frameless door that includes components that need to be maintained in a single, precisely fixed location, such as a latch, door handle, or otherwise, and further includes glass run channels that are readily adjustable relative to the carrier and fixed components thereon.

SUMMARY

This section provides a general summary of the disclosure and is not intended to be considered a complete and comprehensive listing of the disclosure's full scope or all of its aspects, advantages, objectives and/or features.

It is an objective of the present disclosure to provide a motor vehicle door assembly which includes a carrier module that addresses at least those issues discussed above.

It is a related objective of the present disclosure to provide a carrier module which addresses at least those issues discussed above for use with any door assembly of any model of motor vehicle.

It is a related objective of the present disclosure to provide a method of assembling a carrier module on a motor vehicle door which addresses at least those issues discussed above.

It is a related objective of the present disclosure to provide a method of assembling a carrier module on a frameless motor vehicle door which addresses at least those issues discussed above.

In accordance with one aspect of the disclosure, the present disclosure is directed to a carrier module for a frameless motor vehicle door having inner and outer panels defining an internal door cavity. The carrier module includes a pair of carrier members, with each carrier member having a window regulator rail and a lifter plate configured to slide along the window regulator rail in response to movement of a cable. One of the carrier members has a glass run channel and a support member attached thereto and at least one of a latch and door handle support attached to the support member. The glass run channel and the at least one of a latch and door handle support are adjustably moveable relative to one another, thereby streamlining (minimizing the number of steps) and simplifying assembly, thus, reducing the costs associated with assembly.

In accordance with another aspect of the disclosure, the glass run channel can be provided to be adjustably moveable relative to the support member in a cross-vehicle direction.

In accordance with another aspect of the disclosure, the glass run channel can be provided to be adjustably moveable in a cross-vehicle direction relative to the carrier member to which it is attached.

In accordance with another aspect of the disclosure, the latch and/or door handle support can be fixed against movement relative to the support member.

In accordance with another aspect of the disclosure, the support member can be fixed against movement relative to said one of said carrier members.

In accordance with another aspect of the disclosure, the support member has an upper support region and a lower support region, and the carrier module can further include an adjustment feature coupling the lower support region to one of the carrier member and the glass run channel, wherein the adjustment feature is configured to allow the glass run channel to be selectively moved laterally toward and away from the inner panel in the cross-vehicle direction.

In accordance with another aspect of the disclosure, one of the carrier member and the glass run channel can be pivotably attached to the upper support region of the support member.

In accordance with another aspect of the disclosure, the support member can be fixed against movement relative to the carrier member to which it is attached.

In accordance with another aspect of the disclosure, the glass run channel can be fixed against movement relative to the carrier member to which it is attached.

In accordance with another aspect of the disclosure, one of the carrier members can be provided being adjustably moveable relative to the support member.

In accordance with another aspect of the disclosure, at least one of a latch and door handle support can be fixed against movement relative to the support member.

In accordance with another aspect of the disclosure, a door assembly for a vehicle is provided. The door assembly includes an outer panel and an inner panel having at least one opening, with the inner panel being connected to the outer panel to form an internal door cavity. The door assembly further includes a pair of carrier members. Each carrier member has a window regulator rail and a lifter plate configured to slide therealong in response to movement of a cable. One of the carrier members has a glass run channel and a support member attached thereto and at least one of a latch and door handle support attached to the support member, wherein the glass run channel and the at least one of a latch and door handle support are adjustably moveable relative to one another.

In accordance with another aspect of the disclosure, at least one of the latch and door handle support can be fixed against movement relative to the inner panel.

In accordance with another aspect of the disclosure, at least one of the latch and door handle support can be fixed against movement relative to the support member.

In accordance with another aspect of the disclosure, a method of aligning a window of a motor vehicle door assembly within a door panel structure is provided. The method includes providing a carrier assembly having a pair of carrier members with window regulator rails and lifter plates configured to slide along the window regulator rails to move the window between extended and retracted positions. Further, providing one of the carrier members having a support member with a glass run channel and at least one of a latch and door handle support attached to the support member. Further yet, moving the glass run channel relative to the at least one latch and door handle support to align the window in the desired position.

In accordance with another aspect of the disclosure, the method can further include providing the glass run being adjustably moveable relative to the support member.

In accordance with another aspect of the disclosure, the method can further include providing the at least one latch and door handle support being fixed against movement relative to the support member.

In accordance with another aspect of the disclosure, the method can further include providing an adjustment feature coupling a lower support region of the support member to one of the one carrier member and the glass run channel and pivotably attaching an upper support region of the support member to one of the one carrier member and the glass run channel.

In accordance with another aspect of the disclosure, the method can further include adjustably moving the glass run channel relative to the one carrier member in a cross-vehicle direction.

In accordance with another aspect of the disclosure, the method can further include fixing the support member against movement relative to the one carrier member.

In accordance with another aspect of the disclosure, the method can further include fixing the glass run channel against movement relative to the one carrier member.

In accordance with another aspect of the disclosure, the method can further include coupling the one carrier member to the support member for adjustable movement relative thereto.

In accordance with another aspect, there is provided a multi-functional support bracket for a carrier module including a support member attachable to the carrier module, the support member configured to support at least one component attachable to a door panel structure, such as one of an inner or outer panel, or a shut face interconnecting the inner and outer panel, the support member having a glass run channel adjustably moveable relative to the support member.

In accordance with another aspect there is provided a carrier module for a door panel structure of a motor vehicle, the carrier module, including a carrier member extending lengthwise between opposite upper first and lower second ends, the carrier member having a window regulator rail configured for slidable movement of a lifter plate therealong to move a window along a glass run channel, the carrier member having a support member with at least one of a latch and a door handle support attached thereto, such that the glass run channel is supported by the support member, and for example directly supported by the support member. In a related aspect, the glass run channel is adjustable independently from the window regulator rail.

Further areas of applicability will become apparent from the description provided herein. The description and specific examples in this summary are only intended to illustrate certain non-limiting embodiments which are not intended to limit the scope of the present disclosure.

BRIEF DESCRIPTION OF THE DRAWINGS

The drawings described herein are for illustrative purposes only of selected non-limiting embodiments and are not intended to limit the scope of the present disclosure. In this regard the drawings include:

FIG. 7 is a plan view of a carrier member of a carrier module with a support member and glass run channel in accordance with one aspect of the disclosure;

FIG. 7A illustrates an adjustment feature of a carrier module in accordance with one aspect of the disclosure;

FIG. 7B illustrates an adjustment feature of a carrier module in accordance with another aspect of the disclosure;

FIGS. 12A-12C are schematic side elevation views of a carrier module constructed in accordance with another aspect of the disclosure illustrating the carrier module mounted to a door panel with glass run channels of the carrier module, having a window disposed therein, illustrated as being adjustable in the cross-vehicle direction.

DETAILED DESCRIPTION OF PRESENTLY PREFERRED EMBODIMENTS

Figure 1:
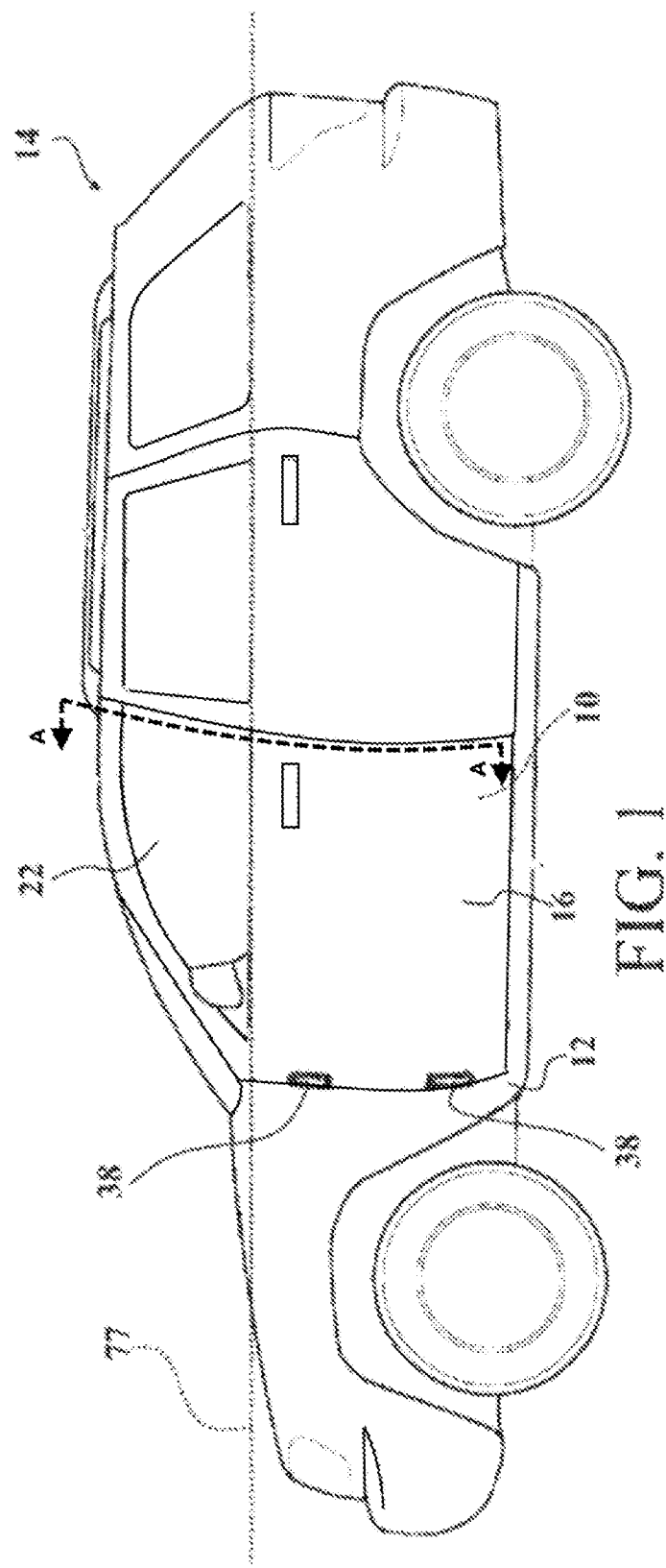
FIG. 1 illustrates a motor vehicle with a door assembly constructed in accordance with one aspect of the disclosure.

The following is a detailed description of example embodiments of a motor vehicle door assembly, carrier module and multi-functional support bracket therefor and of the type configured to be installed within an internal door cavity of a motor vehicle door assembly, including a frameless vehicle door such as would be provided on convertible and luxury style vehicles. A frameless vehicle door as known in the art is a vehicle door that does not include a guiding or surrounding structure extending from the vehicle door panels to frame the vehicle window when in an extended, raised position, as known for framed vehicle doors. As such, a frameless vehicle door, as compared with a framed vehicle door, does not include side supporting structure(s) to assist with guiding and/or sealing the side edges of the window when the window is extending to the raised position or retracting from the raised position, nor an upper supporting portion extending between such side supporting structure(s) for guiding and sealing the top edge of the window when the window is in its fully extended, raised position. It is understood that some support may be provided to the window along the a portion of travel of the vehicle window, such as, for example and without limitation, from a rear view mirror support extending from a forward top portion of the vehicle door panel; however, the alignment and path of travel of the window in a frameless vehicle door will be generally controlled by the carrier module in a manner as will be described herein. A carrier module embodiment disclosed in accordance with one non-limiting aspect of the disclosure includes a pair of carrier members with a pair of window regulator rails attached to the carrier members to facilitate powered movement of the window between extended, raised and retracted, lowered positions, wherein the carrier members are operably coupled to one another via flexible members, such as cables and/or conduits, thereby allowing the carrier members and associated window regulator rails to be independently and freely moved and positioned relative to one another. The carrier members include glass run channels, wherein at least one of the carrier members includes a multi-functional support member configured to support components that need to be maintained in a single, precisely fixed location, such as a latch, door handle, or otherwise, and is further configured to support the glass run channel for adjustable movement in a cross-vehicle direction relative to the carrier member and fixed components thereon. The example embodiments disclosed herein are provided so that this disclosure will be thorough, and will fully convey the scope to those who are skilled in the art. It will be apparent to those skilled in the art that specific details need not be employed, that the example embodiments may be embodied in many different forms, and thus, the disclosed embodiments should not be construed to limit the scope of the disclosure. It is to be further recognized that well-known processes, well-known device structures, and well-known technologies are not described in detail, as they will be readily understood without explanation by those skilled in the art.

Figure 4:
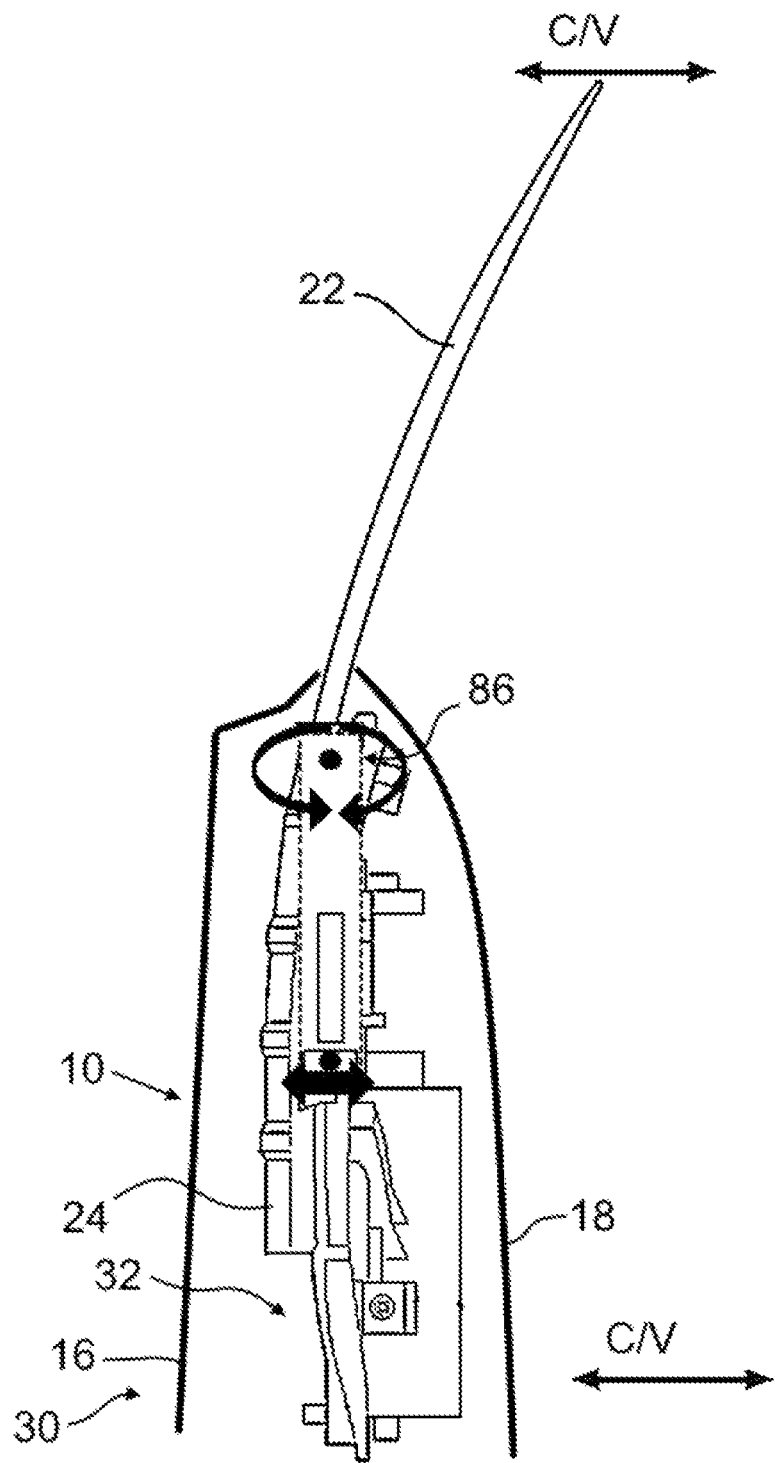
FIG. 4 illustrates the door assembly of FIG. 1 with the window thereof illustrated as being adjustable in a cross-vehicle direction.
Figure 5A:
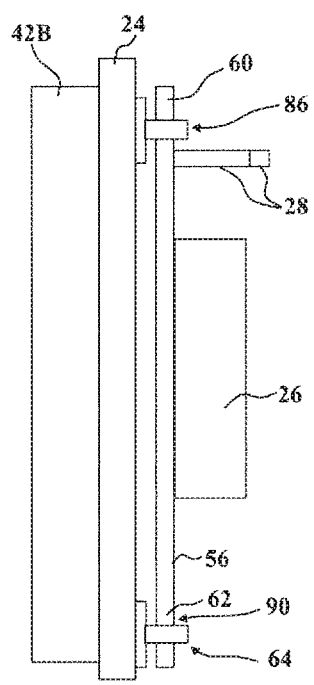
FIG. 5A illustrates a schematic side elevation view of the carrier module of FIG. 2.
Figure 5B:
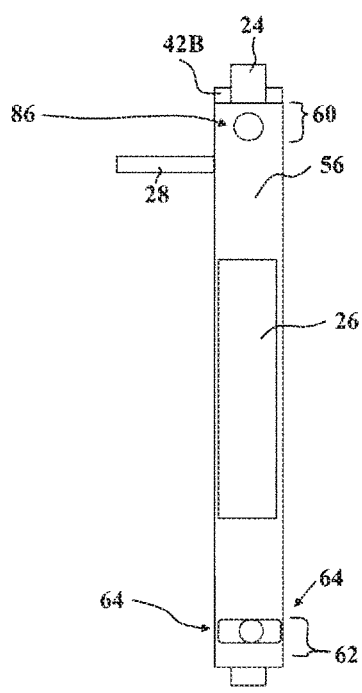
FIG. 5B illustrates a schematic front elevation view of the carrier module of FIG. 2.
Figure 6A:
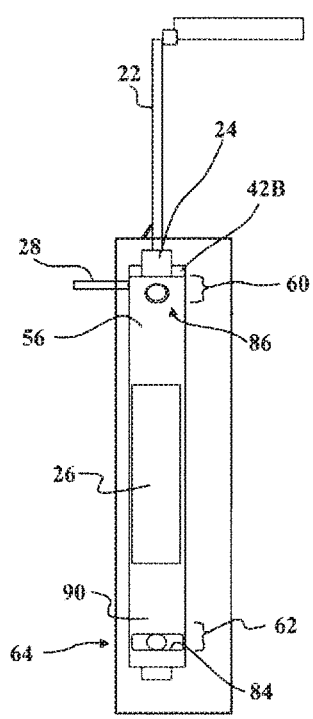
FIGS. 6A-6C are similar views to FIG. 5B illustrating the carrier module mounted to a door panel with glass run channels of the carrier module, having a window disposed therein, illustrated as being adjustable in the cross-vehicle direction.
Figure 6B:
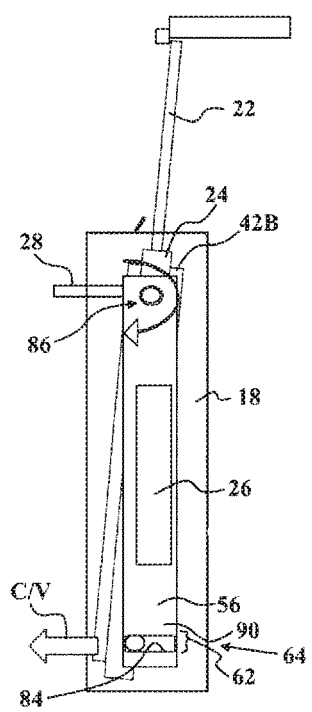
Figure 6C:
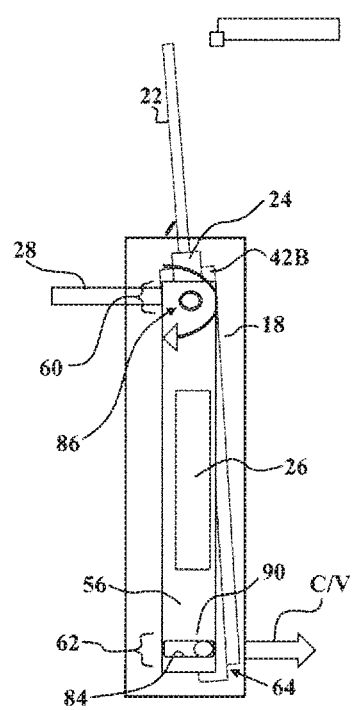
Figure 8:
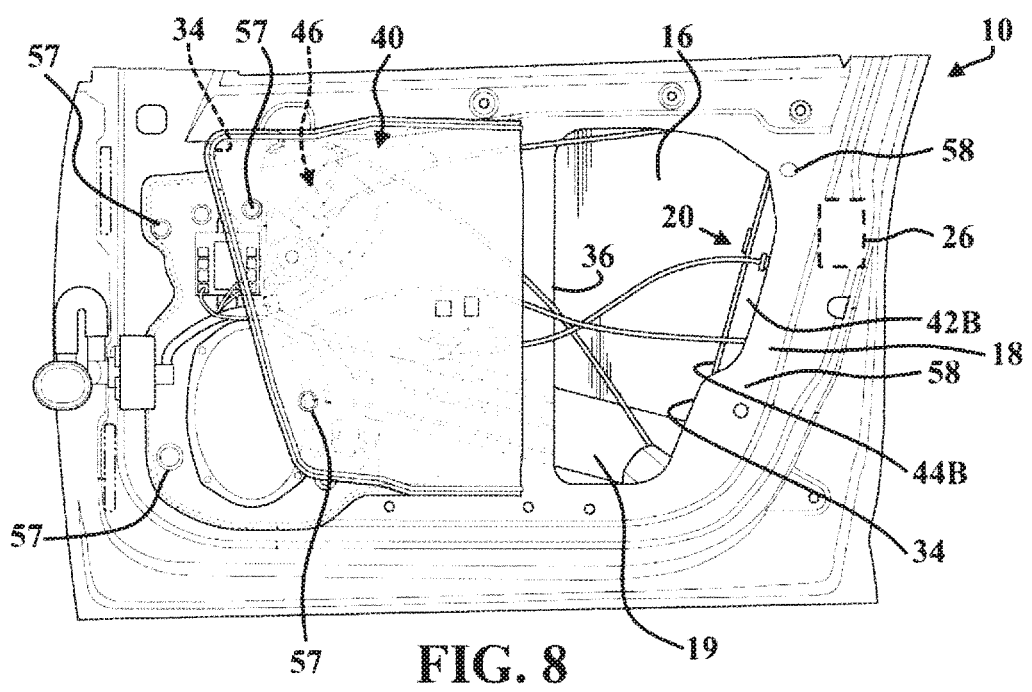
FIG. 8 illustrates an assembled inside view of the door assembly of the motor vehicle of FIG. 1.

Reference is made to FIG. 1, which shows a door assembly 10 mounted to a body 12 of a motor vehicle 14. The door assembly 10 includes an outer panel 16, an inner panel 18 (FIG. 4), an intrusion member 19 (FIG. 8) and a frameless door carrier module, also referred to as carrier module or carrier 20, shown constructed in accordance with one presently preferred aspect of the disclosure. The door assembly 10 is a frameless door assembly in accordance with an illustrative embodiment, that is a door assembly which does not include upwardly extending structural members (e.g. support structures extending above the belt line 77) configured to bound, guide and support the window 22 positioned above the belt line 77. In a frameless door assembly, the window 22 configured to abut and be sealed against the frame of the vehicle body 12, and not a structure of the door assembly 10, such as the side pillars (A-pillar and B-pillar) and the vehicle roof, which are configured to support window seals for sealing the window 22. The carrier 20 is configured to support and guide a window 22 for powered movement between an extended, raised position (closed) and a retracted, lowered position (open) via glass run channels 24 attached thereto. The production, assembly, adjustment of window 22 relative to other components attached to carrier 20 that need to be maintained in a single, precisely fixed location, such as a latch 26, door handle support 28, or otherwise, and operation of the door assembly 10 is facilitated and enhanced directly as a result of the configuration of the carrier 20 and mounting of glass run channels 24 thereto, as discussed further hereafter, and as will be readily appreciated by one skilled in the art.

The outer panel 16 forms at least part of the exterior surface of the door assembly 10. The inner panel 18 provides a structural member for the mounting of one or more trim pieces that form an inner surface of the door assembly 10. Some of the inner panel 18 may itself also form part of the inner surface of the door assembly 10, if desired. The outer and inner panels 16, 18 are connected together to provide a door panel structure 30 that forms an internal door cavity 32 (FIG. 4) that contains various components of the door assembly 10, including at least a portion of the carrier 20. To facilitate assembly of the components into the cavity 32, the inner panel 18 has at least one, and shown as a pair of openings 34 (FIG. 8), by way of example and without limitation. The openings 34 are shown as being formed on opposite sides of the inner panel 18 with a central support member or rail 36 extending therebetween. The central support rail 36 can be formed as an integral, monolithic piece of material with the inner panel 18, thereby rendering the inner panel 18 economical in manufacture and enhancing the structural integrity, strength and side impact resistance of the inner panel 18. Due to the ability of at least some of the carrier components, discussed separately hereafter, to be moved relative to one another, and due to the relatively small size of the individual components of the carrier 20, in comparison to the size of the assembled carrier 20, as discussed in more detail below, and further due to the ability to maintain at least a portion of the carrier 20 externally from the internal door cavity 32, the size of the individual openings 34 needed in the inner panel 18 for assembly of the carrier 20 can be minimized. As such, the amount and area of material forming the inner panel 18 and/or rail 36 can be maximized, thereby increasing the side impact strength of the inner panel 18 relative to inner panels having substantially larger central openings and reduced area.

The outer and inner panels 16, 18 may be made from any suitable material or combination of materials. For example, the outer and inner panels 16, 18 may both be made from a suitable metal (e.g. a suitable steel). In another example, the outer panel 16 may be made from a suitable polymeric or composite material (e.g. fiberglass) and the inner panel may be made from a suitable metal, by way of example and without limitation.

A pair of door hinges 38 are connected to door panel structure 30 and pivotally mount a front end of door panel structure 30 (and door assembly 10) to the vehicle body 12. The door latch 26 is mounted adjacent the rear end of door panel structure 30 to permit releasable closure of door assembly 10 against vehicle body 12. Hinges 38 and door latch 26 act as force transfer members through which forces in door assembly 10 are transmitted to vehicle 14. Such forces include, for example, side-impact forces from another vehicle or object colliding with the vehicle 14. Hinges 38 act to also allow the door assembly 10 to pivot relative to the vehicle body 12 when door assembly 10 is released from door latch 26.

Figure 2:
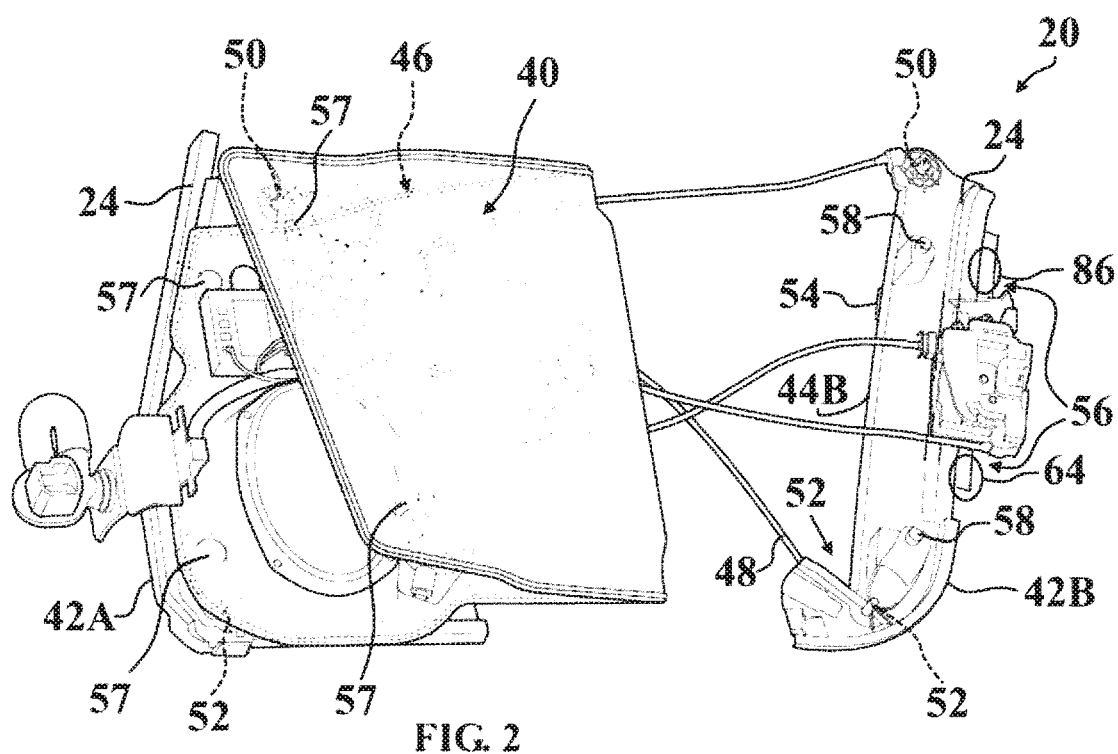
FIG. 2 illustrates a carrier module and barrier of the door assembly of FIG. 1 constructed in accordance with another aspect of the disclosure.
Figure 3:
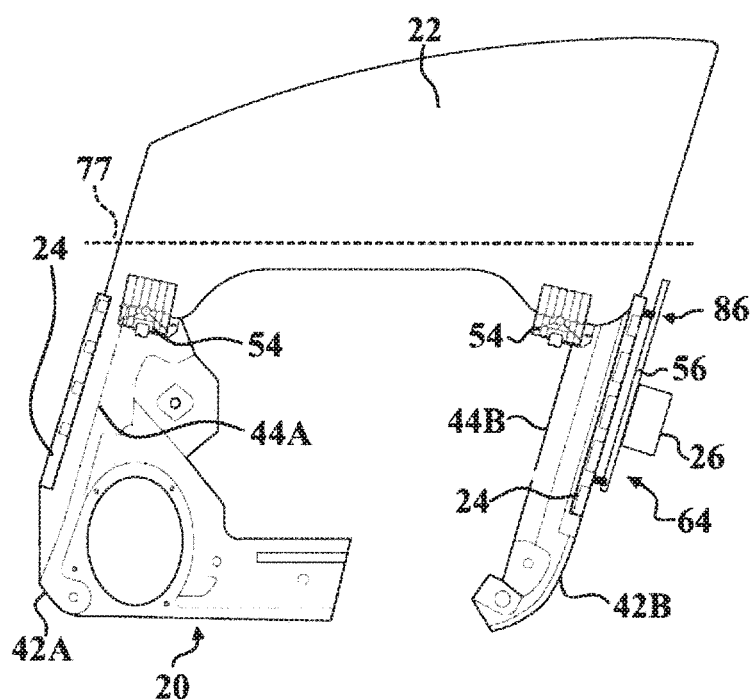
FIG. 3 illustrates the carrier module of FIG. 2 with a window assembled thereto.

The carrier 20 is shown, by way of example and without limitation, to include a barrier member, shown as being a collapsible barrier member 40, by way of example and without limitation, a pair of respective A and B-pillar carrier members 42A, 42B providing a pair of window regulator rails, including, respectively, an A-pillar rail 44A and a B-pillar window regulator rail 44B, and a plurality of door hardware components operably mounted to the carrier members 42A, 42B. In this non-limiting example, at least some of the door hardware includes a power-operated window regulator 46 having an electric motor-driven cable 48, a pair of upper pulleys 50 and lower pulleys 52 (FIG. 2), a pair of lifter plates 54 for moving the window 22 upwardly and downwardly within the pair of glass run channels 24. Further, one of the carrier members 42B includes a support member 56 attached thereto, with at least one, and shown as both of the latch 26 and door handle support 28 being attached to the support member 56. The glass run channel 24 and the latch 26 and door handle support 28 are adjustably moveable relative to one another, thereby facilitating adjustment and proper alignment of the window 22 for smooth sliding motion between opened and closed positions along properly aligned glass run channels 24, which in turn assures proper sealing of the window 22 while in the closed position.

In accordance with a non-limiting embodiment, barrier member 40, intended to function both as a fluid (water) barrier and as a sound barrier, can be formed of any suitable fluid/sound barrier material, as desired, in order to meet the necessary specifications. Further, in order to facilitate assembly, including ensuring the barrier member 40 is properly located and fixed in sealed relation relative to the inner panel 18, the barrier member 40 can be formed with locating features 57, shown by way of example as female recesses, configured for mating engagement with corresponding locating features 58, shown by way of example an male protrusions (FIG. 2), on at least one of the separate carrier members 42A, 42B. The locating features 57, 58 can be formed to provide a snug, interference fit with one another.

The support member 56 can be formed of any suitable metal or polymeric material, and is shown in a non-limiting embodiment of carrier 20 in FIGS. 2-8 as being configured for adjustable movement relative to carrier member 42B, wherein support member 56 is fixed to door panel structure 30, such as to inner panel 18 via any suitable fastening mechanism, including rivets, bolts, screws, and adhesives, by way of example and without limitation. As such, support member 56 is fixed against relative movement with inner panel 18. Further, latch 26 and/or door handle support 28 is fixed to support member 56, and thus, carrier member 42B and support member 56 are adjustably moveable relative to one another. Further yet, glass run channel 24 is fixed to carrier member 42B, and thus, glass run channel 24 and support member 56 are adjustably moveable relative to one another. Accordingly, glass run channel 24 is adjustably moveable relative to latch 26 and/or door handle support 28, due to their being fixed to support member 56, which as noted, is fixed relative to inner panel 18.

In the above configuration, with latch 26 and/or door handle support 28 fixed in their respective positions on door panel structure 30, such as to inner panel 18, glass run channel 24 and carrier member 42B fixed thereto can be readily adjusted to ensure proper movement of window 22 between its closed and opened positions, with assurance of a proper seal being established upon movement of the window 22 into its closed position.

To facilitate relative adjustable movement between carrier member 42B and glass run channel 24 relative to support member 56, the support member 56 is provided having an upper support region 60 and a lower support region 62 and further including an adjustment feature 64 coupling the lower support region 62 to one of the carrier member 42B and the glass run channel 24, and shown as the glass run channel 24, by way of example and without limitation. It is to be recognized that the support member 56 with latch 26 and/or door handle support 28 fixed thereto, glass run channel 24 and intermediate adjustment feature 64 can be provided as a subassembly that can be in turn attached to the carrier member 42B, such as discussed above via use of any suitable fastening mechanism. The adjustment feature 64 allows the glass run channel 24 to be selectively moved laterally conjointly with carrier member 42B toward and away from the inner panel 18 in the cross-vehicle direction.

As shown in FIG. 7A, the adjustment feature 64 can be located adjacent a lower first end of the carrier member 42B, and is shown attached to or formed in part as an extension from a lower end of glass run channel 24, by way of example and without limitation, with adjustment feature 64 being configured to allow cross-vehicle adjustment of the carrier member 42B and glass run channel 24 fixed thereto, and thus, the window 22 is also adjusted in the cross-vehicle direction via glass run channels 24. The adjustment feature 64, in the non-limiting embodiment of FIG. 7, includes a generally C-shaped wall portion 66, as viewed in lateral cross-section. The C-shaped wall portion 66 is formed integrally in lower support region 62, by way of example and without limitation, of support member 56. Wall portion 66 has a generally flat back wall 67 with curled lips 68 extending toward one another to free edges 70 facing one another in mirrored relation. As such, opposed guide channels, referred to hereafter simply as channels 72, are formed and bounded by a portion of the back wall 67 and the lips 68. The free edges 70 are formed having a plurality of uniformly distributed teeth, such as serrated or zig-zag shaped teeth 74, wherein the teeth 74 provide uniform ratchet surfaces opposing one another in mirrored relation, by way of example and without limitation.

The adjustment feature 64 further includes a translatable adjuster, referred to hereafter as slide adjuster 76, a fastener 78 extending in fixed relation from one of carrier member 42B and/or glass run channel 24, and shown as glass run channel 24, by way of example and without limitation. The slide adjuster 76 is configured to slidably move and translate along the cross-vehicle direction C/V, side-to-side vehicle direction, within the channels 72 and to be fixed in a desired cross-vehicle C/V location. The location in which to fix slide adjuster 76 is best determined during assembly, wherein slide adjuster 76 is fixed against translation via the fastener 78 after adjusting the window 22 is the C/V direction via movement of the carrier member 42B and glass run channel 24 to the desired cross-vehicle C/V location. The slide adjuster 76 has opposite flange portions 80 configured for sliding receipt within the channels 72. With the flange portions 80 extending into receipt within the channels 72, the slide adjuster 76 is prevented from being pulled laterally outwardly from the channels 72 along the aft/forward vehicle direction (rear of vehicle to front of vehicle). The slide adjuster 76 also has at least one, and shown as a plurality (pair) of oppositely facing teeth or lock cogs, also referred to as pawls 82, configured to ratchet (click or snap) along the teeth 74 during adjustment, thereby forming a ratchet mechanism, whereupon reaching the desired cross-vehicle C/V location, the fastener 78 can be tightened to fix (lock) the adjustment feature 64 and carrier member 42B in the intended cross-vehicle location. The pawls 82 are shown, by way of example and without limitation, as being formed on bridges 83 extending between the opposite sides of the slide adjuster 76, wherein the bridges 83 can deflect in spring-like fashion inwardly toward one another to facilitate ratcheting adjustment along teeth 74, while springing resiliently outwardly away from one another to allow the teeth 74 to engage teeth of the pawls 82 in ratchet-like fashion. It is to be recognized that the channels 72 could be provided with an increased width relative to the thickness of the flange portions 80, thereby allowing the pawls 82 to be pulled or pushed laterally out of engagement with the teeth 74 to facilitate sliding translation of the slide adjuster 76 along the channels 72, whereupon the pawls 82 can be automatically pushed or pulled back into locked engagement with the teeth 74 upon tightening the fastener 78, as will be readily appreciated by one possessing ordinary skill in the fastener arts upon viewing the present disclosure.

The adjustment feature 64 is shown including an elongate slot 84 in support member 56 configured to extend generally along the cross-vehicle C/V direction. The slot 84 is sized to allow a threaded shank of the fastener 78 to slide therealong during translation of the slide adjuster 76 within the channels 72 of support member 56, such as about +/−10 mm in the cross-vehicle C/V directions. Upon adjusting and ratcheting the slide adjuster 76 to the desired location, with the window 22 and carrier member 42B being properly positioned in the cross-vehicle direction for example, adjusting the slide adjuster 76 causes the carrier member 42B and glass run channel 24 to be properly positioned and maintained in the cross-vehicle direction while causing the window 22 to pivot about an upper region of the carrier member 42B via a pivotal attachment or hinged connection 86 of glass run channel 24 to the upper support region 60 of support member 56. As another example, upon adjusting the window 22 to mate with the roof, A-pillar, and/or B-pillar of the vehicle 14, the carrier member 42B and glass run channel 24 are caused to pivot (about a pivot point) conjointly about an upper position immediately adjacent, or proximate, or at a belt line 77 (known as being the location of a lower horizontal seal along a window opening in the door) of the door panel structure 17. Adjustment of the slide adjuster 76 causes the carrier member 42B, and therefore the glass run channel 24 and window 22, to be properly positioned in the cross-vehicle direction and maintained fixed in the desired cross-vehicle position. Upon carrier glass run channel 24 being properly positioned and maintained in the cross-vehicle direction, the glass run channel 24 can be fixed or locked against relative movement, such as for example a nut 88 can be threaded onto the threaded shank of the fastener 78 and brought into snug, locked engagement with a face 90 of support member 56, and thereby maintaining the slide adjuster 76 and pawls 82 thereof in locked, fixed relation with the teeth 74 of the adjustment feature 64. Locking the glass run channel 24 against relative adjustability can be performed as an additional step, or be automatically locked (e.g. self-fixing) after adjustment as a result of the mechanics of the adjustable mechanism. Accordingly, when the nut 88 is in a loosened state, the slide adjuster 76, and thus the glass run channel 24 and window 22, can be readily adjusted in the cross-vehicle direction, and then, upon being adjusted as desired, the nut 88 can be tightened to fix the slide adjuster 76 relative to the adjustment teeth 74, thereby fixing the carrier member 42B and glass run channel 24 in the desired cross vehicle position.

In the embodiments described herein, the glass run channel 24 may be for example adjusted independently from the window rails 44A, 44B, 144A, 144B, and the glass run channel 24 may be decoupled and independent from the window rails 44A, 44B, 144A, 144B, in other words not directly coupled to, the window rails 44A, 44B, 144A, 144B.

In FIG. 7B, an adjustment feature 64' is shown in accordance with another non-limiting embodiment, wherein the same reference numerals, offset by a prime symbol ('), are used to identify like features.

The adjustment feature 64', rather than having a pawl and teeth ratchet mechanism, as discussed above for the embodiment of adjustment feature 64 of FIG. 7A, has a rack and pinion mechanism to effectuate translation of carrier member 42B' and glass run channel 24 conjointly along and relative to support member 56.

The adjustment feature 64' includes a shaft 92 of a pinion member 94 for selective rotation therein. The pinion member 94 has a pinion gear 96 fixed to the shaft 92. To facilitate adjustment, the shaft 92 of pinion member 94 can be provided with a tool receiver, shown as a receptacle 98 extending into a free end, such as a hex-shaped receptacle, by way of example and without limitation. Those skilled in the art will readily recognize other shapes and configurations for a tool receiver that would allow a tool (not shown) having a complementary driver configuration for selectively engaging the tool receiver to facilitate rotating the pinion member 94.

The adjustment feature 64' is shown including an aperture 100 formed in support member 56 configured to extend generally along the cross-vehicle C/V direction. The aperture 100 is provided with rack teeth 102 along at least one elongate edge of aperture 100, wherein the rack teeth 102 extending along the C/V direction and are configured for meshed engagement with teeth 104 of the pinion gear 96.

To adjust the carrier member 42B' and the glass run channel 24 fixed thereto to the desired cross-vehicle position, the pinion member 94 is rotated via a tool (not shown), by way of example and without limitation, by coupling the tool with the receptacle 98 and rotating the pinion gear 96 in the desired clockwise or counterclockwise directions to position the window 22, glass run channel 24 and carrier member 42B' in the desired cross-vehicle position. Then, upon making the desired adjustment, a nut 88' can be threaded onto a threaded shank of the shaft 92 of pinion member 94 and brought into snug, locked engagement with the face 90 of the support member 56, and thus, maintaining the pinion gear 96 in locked, fixed relation with the rack teeth 102, thereby fixing the glass run channel 24 in the desired cross-vehicle position.

Figure 9:
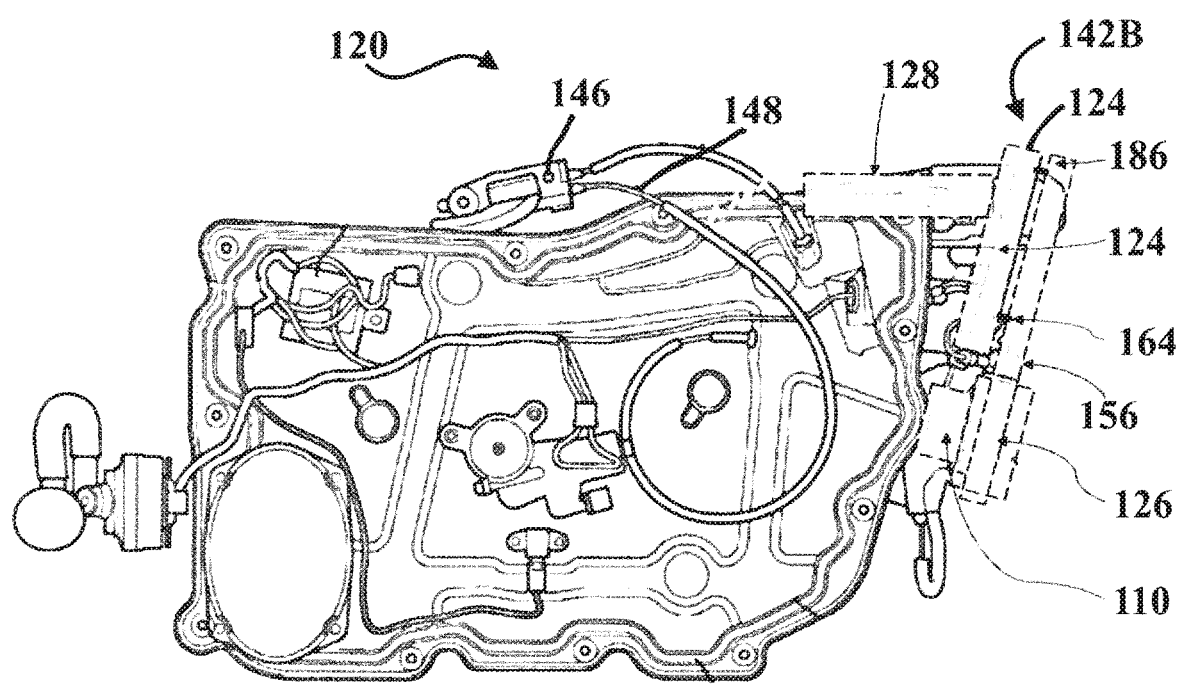
FIG. 9 illustrates an inside view of carrier module and barrier of the door assembly of FIG. 1 constructed in accordance with another aspect of the disclosure.
Figure 10:
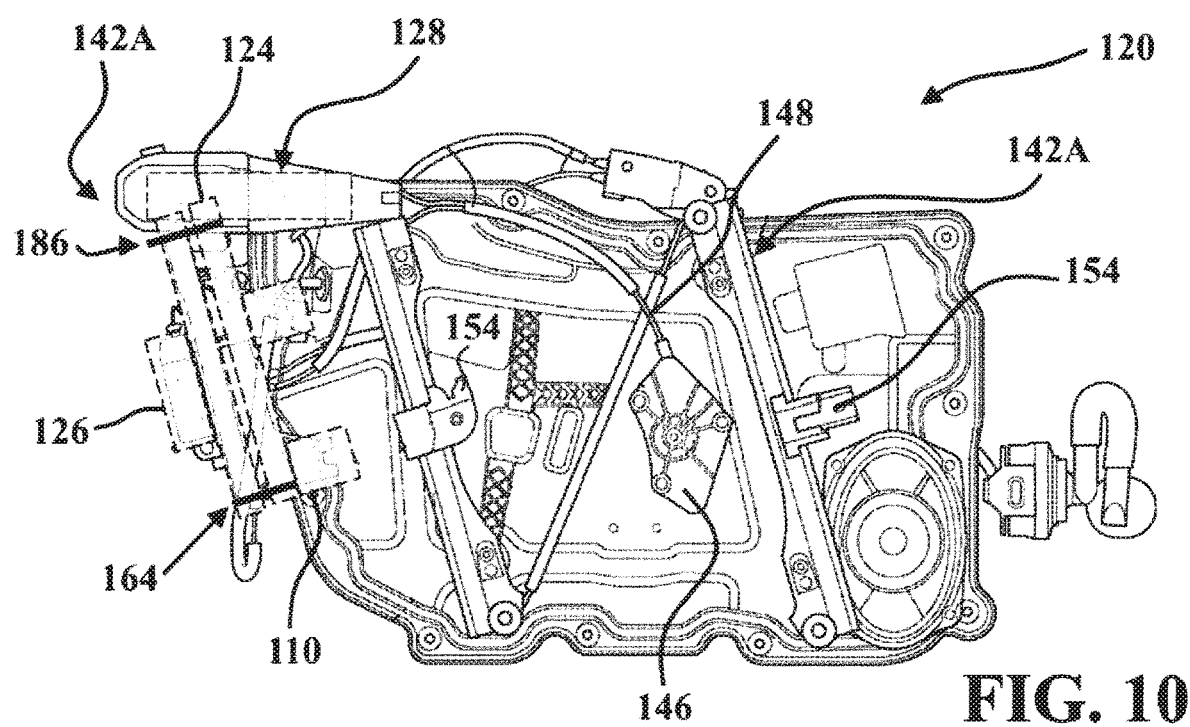
FIG. 10 illustrates an outside view of the carrier module and barrier of FIG. 9.

FIGS. 9 and 10 illustrate schematically a carrier 120 constructed in accordance with another aspect of the disclosure, wherein the same reference numerals, offset by a factor of 100, are used to identify like features.

The carrier 120 is configured to support and guide a window 22 for powered movement between an extended, raised position (closed) and a retracted, lowered position (open) via glass run channels 124 attached thereto. The carrier 120 includes a pair of carrier members 142A, 142B providing a pair of window regulator rails 144A, 144B, and a plurality of door hardware components operably mounted to the carrier members 142A, 142B. In this non-limiting example, as discussed above, carrier 120 includes a power-operated window regulator 146 having an electric motor-driven cable 148, a pair of lifter plates 154 for moving the window 22 upwardly and downwardly within the pair of glass run channels 124, and at least one of a latch 126 and door handle support 128. As a result of the configuration of the carrier 120 and mounting of glass run channels 124 thereto, the ability to adjust the glass run channels 124 and window 22 disposed therein to a desired cross-vehicle orientation, while the at least one of a latch 126 and door handle support 128 remain in a fixed position, is made easy and economical.

As will be appreciated by a person possessing ordinary skill in the art, the carrier 120 includes similar features as discussed above for carrier 20, and thus, only the notable differences are discussed hereafter. The carrier 120 includes carrier members 142A, 142B with a support member 156 attached to carrier 120, such as to carrier member 142B or directly to another portion of carrier 120, by way of example and without limitation. Support member 156 is shown attached to carrier 120 via a connection member, referred to hereafter as connector 110, wherein connector 110 can be a separate component fixed to both carrier 120 and support member 156 via any suitable fastening mechanism, such as bolts, screws, adhesives and the like, or it is contemplated that connector 110 could be formed as a monolithic piece of material with one of the carrier 120 and support member 156. Latch 126 and/or door handle support 128 are attached in fixed relation to the support member 156, wherein the glass run channel 124 and the latch 126 and/or door handle support 128 are adjustably moveable relative to one another.

Figure 11A:
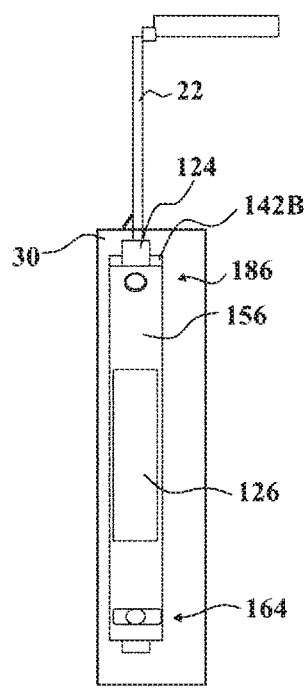
FIGS. 11A-11C are schematic side elevation views of the carrier module of FIGS. 9 and 10 illustrating the carrier module mounted to a door panel with glass run channels of the carrier module, having a window disposed therein, illustrated as being adjustable in the cross-vehicle direction.
Figure 11B:
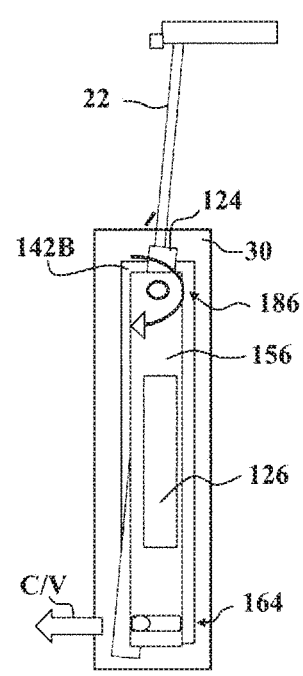
Figure 11C:
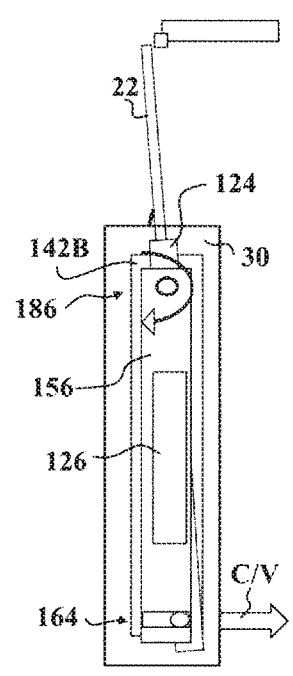

In difference to the carrier 20, the support member 156 is fixed to the carrier member 142B against movement relative thereto via connector 110, as discussed above. Thus, with latch 126 and/or door handle support 128 being fixed against movement to support member 156, the carrier 120, support member 156 and latch 126 and/or door handle support 128 are all fixed against relative movement with one another. Accordingly, during assembly, latch 126 and/or door handle support 128 are automatically positioned in their intended fixed locations on door panel structure 30. In contrast, glass run channel 124, as best illustrated in FIGS. 11A-11C, is readily adjustable in the cross-vehicle direction relative to carrier 120 to allow the window 22 to be properly position for optimal sealing with roof, as discussed above for glass run channel 24.

The ability to adjust glass run channel 124 is provided via an adjustment feature 164 and pivotal attachment 186. The adjustment feature 164 and pivotal attachment 186 are provided to couple glass run channel 124 in pivotably coupled relation to the support member 156. Accordingly, with support member 156 being operably fixed to carrier 120 via connector 110, glass run channel 124 is adjustably moveable relative to support member 156, carrier 120 and latch 126 and/or door handle support 128. The details of adjustment feature 164 and pivotal attachment 186 are as discussed above for adjustment feature 64 and pivotal attachment 86, and thus, repetition is avoided here.

FIGS. 12A-12C illustrate schematically a carrier 220 constructed in accordance with another aspect of the disclosure, wherein the same reference numerals, offset by a factor of 200, are used to identify like features.

The discussion hereafter for carrier 220 is equally applicable to both exemplary embodiments discussed above for carriers 20 and 120. The notable difference of carrier 220 is with regard to the pivotal attachment 286, which, as shown is between carrier member 242B and inner panel 18; however, as noted, the pivotal attachment 286 can be equally present between the glass run channel 224 and support member 256. In the embodiment illustrated, latch 226 is fixed to support member 256, as discussed above for latch 26. Given the similarities of carrier 220 with carriers 20 and 120, no further discussion is needed with regard to the relative movements between carrier member 242B, glass run channel 224, support member 256, and latch 226, as one skilled in the art, in view of the discussion above, will readily understand the different permutations possible. The pivotal attachment 286 is provided as a 4-bar linkage located adjacent an upper support region 260, though it is to be understood that the location of the pivot axis for glass run channel 224, as well as for glass run channels 24, 124, can be located anywhere along the length of glass run channels 24, 124, 224, as desired for the intended application. It is to be further understood that pivotal attachment 286, although shown as being provided as a 4-bar linkage, could be provided otherwise, such as a pin-through-hole connection, slider-in-hole connection, slider-through-slot connection, or otherwise, which is equally applicable to pivotal attachments 86, 186.

In accordance with another aspect of the disclosure, a multi-functional support bracket for a carrier module 20, 120, 220 is provided. The multi-function bracket includes a support member 56, 156, 256 being one of fixedly or removeably attachable to the carrier module 20, 120, 220. The support member 56, 156, 256 is configured to support at least one component, e.g. door handle support 28, 128, latch 26, 126, or otherwise, attachable to a door panel structure 30. The support member 56, 156, 256 has a glass run channel 24, 124, 224 adjustably moveable in a cross-vehicle direction relative to the support member 56, 156, 256.

Figure 13:
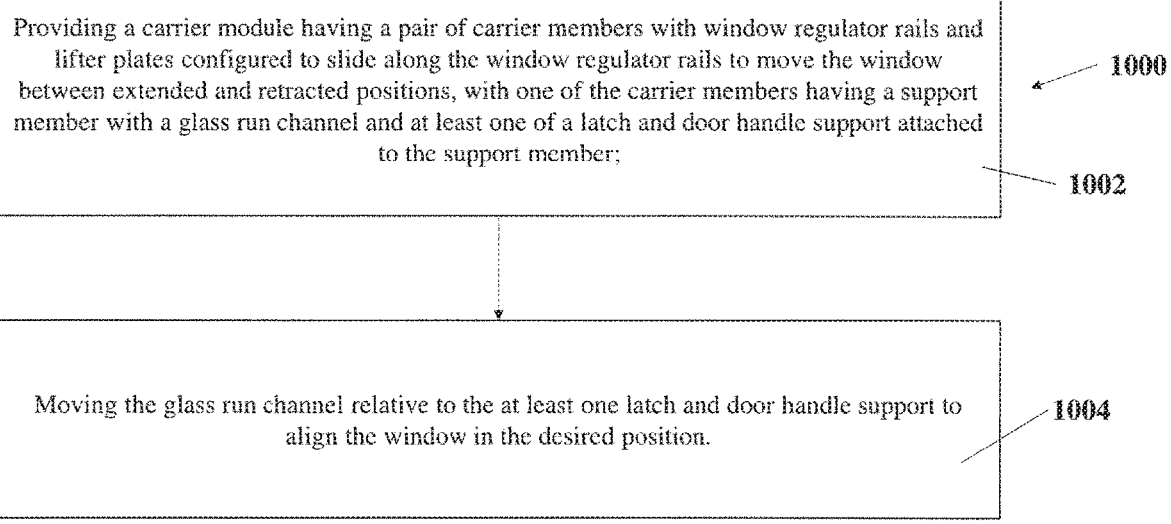
FIG. 13 illustrates a method of adjustably aligning a glass run channel relative to a door component fixed to a vehicle door.

In view of the structural features of the carrier modules 20, 120, 220 discussed above and illustrated, an improved method of aligning a window 22 of a motor vehicle door assembly 10 within a door panel structure 30 is provided. With reference to FIG. 13, the method 1000 includes providing 1002 a carrier module 20, 120, 220 having a pair of carrier members 42A, 42B; 142A, 142B with window regulator rails 44A, 44B and lifter plates 54, 154 configured to slide along the window regulator rails to move the window 22 between extended and retracted positions, with one of the carrier members 42B, 142B having a support member 56, 156, 256 with a glass run channel 24, 124, 224 and at least one of a latch 26, 126, 226 and door handle support 28, 128 attached to the support member 56, 156, 256; and moving 1004 the glass run channel 24, 124, 224 relative to the at least one latch 26, 126, 226 and door handle support 28, 128 to align the window 22 in the desired position.

The method 1000 can further include, in combination where appropriate or separately, providing the glass run channel 24, 124, 224 being adjustably moveable relative to the support member 56, 156, 256; providing the at least one latch 26, 126, 226 and door handle support 28, 128 being fixed against movement relative to the support member 56, 156, 256; providing an adjustment feature coupling a lower support region 62 of the support member 56, 156, 256 to one of the one carrier member 42B, 142B and the glass run channel 24, 124, 224 and pivotably attaching an upper support region 60, 260 of the support member 56, 156, 256 to one of the one carrier member 42B, 142B and the glass run channel 24, 124, 224; adjustably moving the glass run channel 124, 224 relative to the one carrier member 142B in a cross-vehicle direction; further including fixing the support member 156, 256 against movement relative to the one carrier member 142B; further including fixing the glass run channel 24, 224 against movement relative to the one carrier member 42B; and further including coupling the one carrier member 42B to the support member 56, 256 for adjustable movement relative thereto.

While the above description constitutes a plurality of embodiments of the present invention, it will be appreciated that the present invention is susceptible to further modification and change without departing from the fair meaning of the accompanying claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A carrier module for a door panel structure, having an inner panel and an outer panel, of a motor vehicle, said carrier module, comprising:
   a carrier member mountable to the inner panel, said carrier member extending lengthwise between opposite upper first and lower second ends, said carrier member having a window regulator rail configured for slidable movement of a lifter plate therealong to move a window along a glass run channel, said carrier member having a support member with at least one of a latch and a door handle support attached thereto, wherein said glass run channel is adjustable relative to said support member, wherein said glass run channel is adjustable in a cross-vehicle direction relative to said support member, and wherein said support member has an upper support region and a lower support region and further including an adjustment feature coupling said lower support region to said glass run channel, said adjustment feature allowing said glass run channel to be adjusted in the cross-vehicle direction relative to said support member.

2. The carrier module of claim 1, wherein at least one of said latch and said door handle support is fixed against movement relative to said support member.

3. The carrier module of claim 1, wherein said glass run channel is pivotably attached to said upper support region of said support member.

4. The carrier module of claim 3, wherein said glass run channel is adjustably moveable relative to said carrier member in a cross-vehicle direction.

5. The carrier module of claim 4, wherein said support member is fixed against movement relative to said carrier member.

6. The carrier module of claim 1, wherein said adjustment feature is one of a ratchet mechanism or a rack and pinion mechanism.

7. The carrier module of claim 1, wherein said support member is configured to support said glass run channel.

8. The carrier module of claim 1, wherein said glass run channel is adjustable independently from said window regulator rail.

9. A door assembly for a vehicle, comprising:
   an outer panel;
   an inner panel having at least one opening, said inner panel being connected to said outer panel to form an internal door cavity; and
   at least one carrier member operably fixed to said inner panel, said at least one carrier member extending lengthwise between opposite upper first and lower second ends and having a window regulator rail and a lifter plate configured to slide along said window regulator rail in response to movement of a cable, at least one of said at least one carrier member having a glass run channel and a support member attached thereto and at least one of a latch and door handle support attached to said support member, wherein said glass run channel is adjustably moveable relative to said at least one of a latch and door handle support, and wherein said support member has an upper support region and a lower support region and further includes an adjustment feature coupling said lower support region to at least one of said at least one carrier member and said glass run channel, said adjustment feature allowing said glass run channel to be selectively moved laterally toward and away from said inner panel in a cross-vehicle direction.

10. The door assembly of claim 9, wherein said glass run channel is pivotably moveable relative to said upper support region of said support member.

11. The door assembly of claim 10, wherein said glass run channel is pivotably moveable relative to a pivot point located adjacent to a belt line of the door assembly.

12. The door assembly of claim 10, wherein the door assembly is a frameless door assembly.

13. The door assembly of claim 12, wherein said glass run channel is fixable against being adjustably moveable.

14. A method of aligning a window of a motor vehicle door assembly within a door panel structure having an inner panel and an outer panel, comprising:
   providing a carrier assembly mountable to the inner panel and having a carrier member with a window regulator rail and lifter plate configured to slide along the window regulator rail to move the window between extended and retracted positions, with the carrier member having a support member with a glass run channel and at least one of a latch and door handle support attached to the support member;
   providing an adjustment feature coupling a lower support region of the support member to at least one of the carrier member and the glass run channel and pivotably attaching an upper support region of the support member to at least one of the carrier member and the glass run channel and adjustably moving the glass run channel relative to the carrier member in a cross-vehicle direction; and moving the glass run channel relative to the at least one latch and door handle support to align the window.

15. The method of claim 14, further including providing the at least one latch and door handle support being fixed against movement relative to the support member.

16. The method of claim 14, further including fixing the glass run channel against movement relative to the carrier member.

* * * * *